A. P. OLSON.
FASTENER FOR CLUTCH AND BRAKE LININGS.
APPLICATION FILED JULY 19, 1918.
1,296,843.
Patented Mar. 11, 1919.
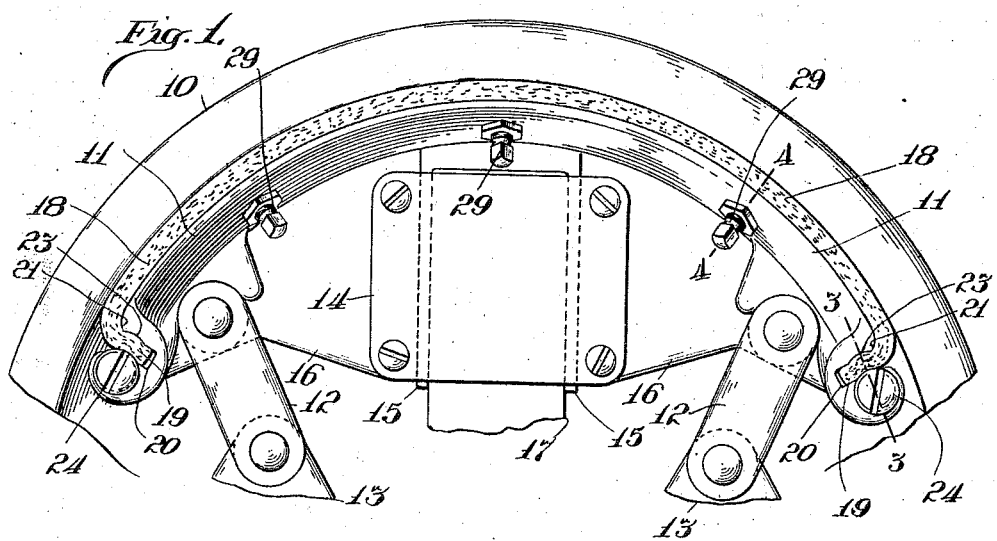
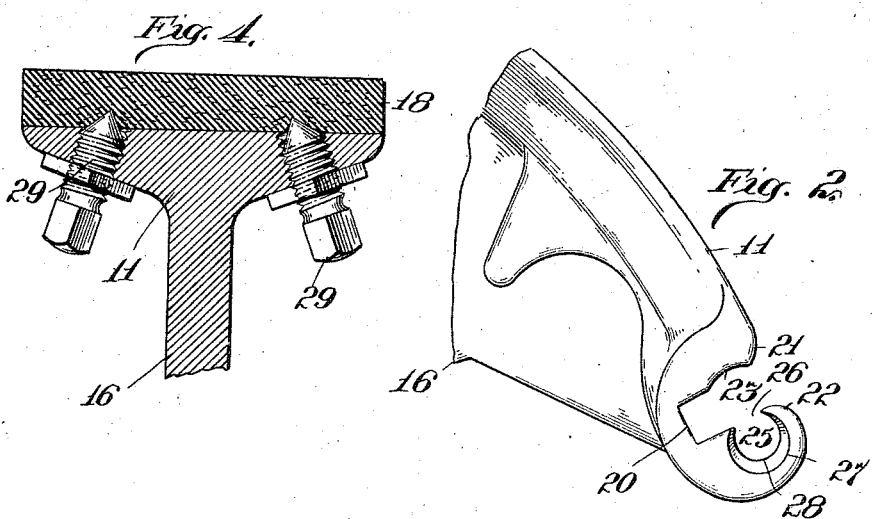
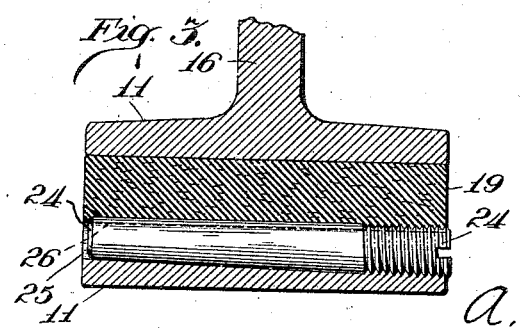
Inventor
A. P. Olson
J. M. Roberts
his Attorney.

UNITED STATES PATENT OFFICE.

ANDREW P. OLSON, OF CHICAGO, ILLINOIS.

FASTENER FOR CLUTCH AND BRAKE LININGS.

1,296,843.  Specification of Letters Patent.  Patented Mar. 11, 1919.

Application filed July 19, 1918. Serial No. 245,607.

*To all whom it may concern:*

Be it known that I, ANDREW P. OLSON, a citizen of the United States, residing at Chicago, in the county of Cook and State of Illinois, have invented certain new and useful Improvements in Fasteners for Clutch and Brake Linings, of which the following is a specification, reference being had therein to the accompanying drawing.

My invention relates to fasteners for brake and clutch linings, and consists in the matters hereinafter described and pointed out in the appended claims.

In the accompanying drawings which illustrate a practical embodiment of the features of my invention, Figure 1 is a view in side elevation of a pair of friction clutch or brake members equipped with my invention, certain parts being broken away for simplicity of illustration;

Fig. 2 is a detail side view of one end of the movable member;

Fig. 3 is a detail sectional view on the line 3—3 of Fig. 1, and

Fig. 4 is a similar view on the line 4—4 of Fig. 1.

In the drawings the reference numerals 10 and 11 represent the opposing and cooperating members of a friction clutch or brake, the former being the relatively stationary member and the latter the relatively movable member of the pair, 12 indicates the usual toggle links pivoted to the member 11 and to the movable parts 13 to cause the member 11 to engage and disengage the member 10, and 14 indicates a guide-plate secured across a channel 15 in the web 16 of the movable member to provide a way for the guide arm 17 on which the movable member freely slides and is guided. These parts are of typical construction and represent the arrangement disclosed in my Letters Patent of the United States numbered 782,985, to which reference may be made for details if desired, it being understood that they are chosen merely for purpose of illustrating an application of the various features of my present invention and that the relatively stationary member 10 may be the brake drum or pulley fixed upon the axle or wheel of an automobile or other machinery and that the member 11 may be the coacting brake band thereof.

The member 11 carries a removable brake shoe or lining 18, usually of suitable heat-resisting flexible material, such as asbestos cloth, to provide frictional engagement with the relatively stationary member 10, and this shoe or lining is in the form of a strip somewhat longer than the body of the member 11 so that its ends 19 may be turned down into the angular channels 20 formed in the ends of the member and which are rounded off at their inner edges as at 21 to prevent fracturing the lining and at their outer edges as at 22 to facilitate the introduction of the ends of the strip. The channels are provided on their inner faces with depressions 23 into which the material at or near the ends of the strip is forced by tapered pins 24 which enter holes 25 made in the end portions of the member 11 and having slots 26 at one side leading into the channels 20 opposite the depressions 23, the slots 26 being of sufficient width or size to allow the pins to protrude laterally into the channels sufficiently to crowd the material of the ends of the lining in the opposite depressions 23 as shown in Fig. 1. The holes for the tapered pins are made on a corresponding taper as indicated at 27, 28 in Fig. 2 so that when the pins are in place their lateral projection into the channels is uniform throughout their length. The larger ends 27 of the holes are tapped to receive threads on the heads of the pins so that the latter may be screwed to place.

In assembling the lining on the member 11 its ends 19 are passed into the channels 20, where they close the slots 26 of the pin holes 25, and the reduced ends of the pins are inserted into the larger ends of the holes, which by reason of their increased cross-sectional area at their receiving ends permit the pins to freely enter between their wall and the straight surface of the strip then closing the side slots into the channels, and the pins are then crowded down into their holes until their threads reach the corresponding threads in the enlarged portions of the holes, when a screw-driver is applied and the pins are screwed down to place, the passage of the tapered pins into the reversely tapered holes crowding them against the lining and forcing the latter into the opposite depressions 23. The lining is thus securely held in place, and the operation of removing and replacing a lining involves only the removal and replacement of its ends in their channels and of the associated pins in their holes. While I prefer to employ a flexible lining I may use a set or fixed lining in which permanent offsets are formed to fit the depressions 23 and to receive the portions of the pins 24 projecting laterally through the slots 26.

The lining is held intermediately against slipping by means of pointed set screws 29 that pass through the member 11 and enter the lining on a taper for about one third of its thickness. These screws are usually arranged in opposite pairs, and are particularly effective to prevent lateral or side displacement or slippage of the lining.

I claim:—

1. In a device of the character described, a relatively stationary friction member, a relatively movable member to engage and disengage the first member and having tapered pin-holes near its ends, cross-channels in the second member having depressions in one side and slots in the opposite side leading into the pin-holes, a lining strip on the second member having its ends in the channels, and tapered pins seating in the holes and protruding laterally through the slots to crowd the ends of the lining into the depressions.

2. In a device of the character described, a friction drum and a band having tapered pin-holes near its ends, cross-channels in the band having depressions in one side and slots in the opposite side leading into the pin-holes, a flexible lining on the band having its ends in the channels, and tapered pins seating in the holes and protruding laterally into the channels to crowd the ends of the lining into the depressions.

3. In a device of the character described, a friction drum and a band having tapered pin-holes near its ends, cross-channels in the band having depressions in one side and slots in the opposite side leading into the pin-holes, the edges of the channels being rounded off, a flexible lining on the band having its ends in the channels, and tapered pins having threaded engagement with the holes and protruding laterally through the slots to crowd the ends of the lining into the depressions.

In testimony whereof I affix my signature in presence of two witnesses.

ANDREW P. OLSON.

Witnesses:
J. McROBERTS,
BERNICE GORMLEY.

Copies of this patent may be obtained for five cents each, by addressing the "Commissioner of Patents, Washington, D. C."